United States Patent
Liu et al.

(10) Patent No.: US 10,328,571 B2
(45) Date of Patent: Jun. 25, 2019

(54) SERVO CONTROL SYSTEM AND ROBOT

(71) Applicant: UBTECH Robotics Corp., Shenzhen (CN)

(72) Inventors: Dong Liu, Shenzhen (CN); Youjun Xiong, Shenzhen (CN)

(73) Assignee: UBERTECH Robotics Corp., Shenzhen (CN)

( * ) Notice: Subject to any disclaimer, the term of this patent is extended or adjusted under 35 U.S.C. 154(b) by 438 days.

(21) Appl. No.: 15/321,729

(22) PCT Filed: Oct. 28, 2016

(86) PCT No.: PCT/CN2016/103830
§ 371 (c)(1),
(2) Date: Dec. 22, 2016

(87) PCT Pub. No.: WO2018/076297
PCT Pub. Date: May 3, 2018

(65) Prior Publication Data
US 2018/0257224 A1    Sep. 13, 2018

(51) Int. Cl.
G05B 19/05 (2006.01)
B25J 9/12 (2006.01)
G05B 13/02 (2006.01)
B25J 9/00 (2006.01)
B25J 13/00 (2006.01)
G05B 19/042 (2006.01)

(52) U.S. Cl.
CPC ............ B25J 9/126 (2013.01); B25J 9/0009 (2013.01); B25J 13/006 (2013.01); G05B 13/024 (2013.01); G05B 19/042 (2013.01); Y10S 901/06 (2013.01); Y10S 901/09 (2013.01); Y10S 901/23 (2013.01)

(58) Field of Classification Search
CPC .... B25J 13/006; G05B 13/024; Y10S 901/09; Y10S 901/23
See application file for complete search history.

(56) References Cited

U.S. PATENT DOCUMENTS

2012/0158157 A1* 6/2012 Yeh ..................... G05B 19/05
700/12

* cited by examiner

Primary Examiner — Muhammad S Islam (57) ABSTRACT

The present invention discloses a servo control system and a robot. The servo control system is applied to a servo and includes a main control module and a communication module including a first communication port, a second communication port, a third communication port, a fourth communication port, a voltage balancing circuit and a balance voltage output terminal. The balance voltage output terminal is coupled to the third communication port and the fourth communication port through the voltage balancing circuit. The main control module sends a first communication signal to the host computer via the first communication port, and receives a second communication signal transmitted from the host computer via the second communication port. The balance voltage output terminal controls a common mode voltage difference between the first communication signal and the second communication signal via the voltage balancing circuit. In the above manner, identification numbers of servos can be reassigned. Servos can be freely reinstalled without being limited to the original positions of these servos and can still perform control instructions sent by the host computer, which is convenient for reinstalling.

20 Claims, 7 Drawing Sheets

SERVO CONTROL SYSTEM AND ROBOT

BACKGROUND

1. Technical Field

The present disclosure relates to automation control technology, and particularly to a servo control system and a robot.

2. Description of Related Art

With the advancement of technology, robotic technology has been greatly developed and been gradually into people's daily lives. In robotic technology, servos are important assemblies of a robot. A servo control system is an important component of a servo and controls each servo of a robot to perform various operations.

The ID numbers of servos in robots of existing technology are fixed. During installing/detaching, the position of a servo cannot be changed freely. If one of the servos is changed, there may exist at least two servos with the same ID numbers. It needs repeated tests, which is inefficient.

SUMMARY

In view of this, the present invention provides a servo control system and a robot that can reassign servo identification numbers. Servos can be freely reinstalled without being limited to original positions of the servos and can still perform instructions sent by a host computer, which is convenient for reinstalling.

In order to resolve the aforementioned problems, a servo control system provided by the present invention is applied to a servo electrically coupled to a host computer. The servo control system includes a main control module including two data terminals; and a communication module including a first communication port, a second communication port, a third communication port, a fourth communication port, a voltage balancing circuit, and a balance voltage output terminal. The first communication port and the second communication port are respectively, correspondingly coupled to the two data terminals of the main control module. The third communication port and the fourth communication port are both coupled to the host computer. The balance voltage output terminal is coupled to the third communication port and the fourth communication port via the voltage balancing circuit. Wherein the main control module sends a first communication signal to the host computer via the first communication port, and receives a second communication signal transmitted from the host computer via the second communication port, and the balance voltage output terminal controls a common mode voltage difference between the first communication signal and the second communication signal via the voltage balancing circuit.

Wherein, the voltage balancing circuit includes a capacitor, a first resistor, and a second resistor. The third communication port of the communication chip is grounded via the first resistor and the capacitor that are coupled in series to each other. The fourth communication port of the communication chip is coupled to a node between the first resistor and the capacitor via the second resistor. The balance voltage output terminal of the communication chip is coupled to the node between the between the first resistor and the capacitor.

Wherein, the communication module and the main control module, as well as the communication module and the host computer, are connected to and communicate with each other via a CAN bus.

Wherein, the servo control system further includes a power supply module and a charge detection module coupled to the main control module. The power supply module is configured to provide a power supply for the servo, and the charge detection module is configured to collect a charge of a batters inside the servo.

Wherein, the servo control system further includes an angle collection module coupled to the main control module. The angle collection module is configured to acquire information of rotation angle of the servo, and the main control module is further configured to control motion of the servo according to the information of angle.

Wherein, the angle collection module includes a magnetic encoder configured to acquire information of angle of the servo according to change of magnetic field when the driving motor rotates.

Wherein, the servo control system further includes a driving module coupled to the main control module. The driving module is configured to receive a control signal transmitted from the main control module and output a driving pulse signal according to the control signal to drive an electric motor arranged in the servo to rotate.

Wherein, the servo control system further includes a current sampling module configured to detect a current operating current of the electric motor and feedback the current operating current of the electric motor to the main control module, thereby causing the main control module to adjust a waveform of the driving pulse signal according to the current operating current of the electric motor.

Wherein, the servo control system further includes a temperature collection module coupled to the main control module. The temperature collection module is configured to collect a temperature of the electric motor. If the collected temperature of the electric motor is greater than a preset threshold value, the main control module controls the electric motor to stop rotating, or reduces a rotation speed of the electric motor.

The present invention further provides a robot including a host computer and a plurality of servos coupled to the host computer. Each servo includes a servo control system, and the servo control system includes: a main control module comprising two data terminals; and a communication module including a first communication port, a second communication port, a third communication port, a fourth communication port, a voltage balancing circuit, and a balance voltage output terminal. The first communication port and the second communication port are respectively, correspondingly coupled to the two data terminals of the main control module. The third communication port and the fourth communication port are both coupled to the host computer. The balance voltage output terminal are coupled to the third communication port and the fourth communication port via the voltage balancing circuit. The main control module sends a first communication signal to the host computer via the first communication port, and receives a second communication signal from the host computer via the second communication port. The balance voltage output terminal controls a common mode voltage difference between the first communication signal and the second communication signal via the voltage balancing circuit.

Wherein, the voltage balancing circuit comprises a capacitor, a first resistor, a second resistor, the third communication port of the communication chip is grounded via the first resistor and the capacitor that are coupled in series to each other, the fourth communication port of the communication chip is coupled to a node between the first resistor and the capacitor via the second resistor, and the balance voltage output terminal of the communication chip is coupled to the node between the between the first resistor and the capacitor.

Wherein, the communication module and the main control module, as well as the communication module and the host computer, are connected to and communicate with each other via a CAN bus.

Wherein, the servo control system further includes a power supply module and a charge detection module coupled to the main control module. The power supply module is configured to provide a power supply for the servo, and the charge detection module is configured to collect a charge of a battery inside the servo.

Wherein, the servo control system further includes an angle collection module coupled to the main control module. The angle collection module is configured to acquire information of rotation angle of the servo, and the main control module is further configured to control motion of the servo according to the information of angle.

Wherein, the angle collection module includes a magnetic encoder configured to acquire information of angle of the servo according to change of magnetic field when the driving motor rotates.

Wherein, the servo control system further includes a driving module coupled to the main control module. The driving module is configured to receive a control signal transmitted from the main control module and output a driving pulse signal according to the control signal to drive an electric motor arranged in the servo to rotate.

Wherein, the servo control system further includes a current sampling module configured to detect a current operating current of the electric motor and feedback the current operating current of the electric motor to the main control module, thereby causing the main control module to adjust a waveform of the driving pulse signal according to the current operating current of the electric motor.

Wherein, the servo control system further includes a temperature collection module coupled to the main control module. The temperature collection module is configured to collect a temperature of the electric motor. If the collected temperature of the electric motor is greater than a preset threshold value, the main control module controls the electric motor to stop rotating, or reduces a rotation speed of the electric motor.

The present invention further provides a robot including a host computer and a plurality of servos coupled to the host computer. Each servo includes a servo control system and the servo control system includes: a main control module including a first data terminal and a second data terminal; and a communication module including a first communication port, a second communication port, a third communication port, a fourth communication port. The first communication port and the second communication port are respectively, correspondingly coupled to the first data terminal and the second data terminal of the main control module. The third communication port and the fourth communication port are coupled to the host computer. The main control module sends a first communication signal to the host computer via the first communication port, and receives a second communication signal transmitted from the host computer via the second communication port. When one servo is powered up, the host computer identifies a serial number preset inside the servo via the first data terminal and the first communication port of the servo, the host computer assigns an identity identification number to the servo according to the identified serial number of the servo, and transmits the identity identification number to the main control module of the servo via the second communication port of the communication module and the second data terminal of the main control module.

Wherein, the communication module further includes a balance voltage output terminal and a voltage balancing circuit. The voltage balancing circuit is coupled to the third communication port and the fourth communication port, and the balance voltage output terminal controls a common mode voltage difference between the first communication signal and the second communication signal via the voltage balancing circuit.

With the aforementioned technical solutions, the beneficial effects of the present invention are: Being different from the existing technology, the servo control system of the present invention includes a main control module including two data terminals; and a communication module including a first communication port, a second communication port, a third communication port, a fourth communication port, a voltage balancing circuit and a balance voltage output terminal. The first communication port and the second communication port are respectively, correspondingly coupled to the two data terminals of the main control module. The third communication port and the fourth communication port are coupled to the host computer. When one servo is powered up, through the communication module, the host computer can receive/identify a serial number of each servo, and assigns different identity identification numbers to different servos according to the serial number of each servo. Thus, after at least one servo of the robot is detached, these servos can be freely reinstalled without being limited to the original positions of these servos and can still perform control instructions sent by the host computer, which is convenient for reinstalling.

BRIEF DESCRIPTION OF THE DRAWINGS

In order to more clearly describe the technical solution(s) of the embodiment(s) of the present invention, the drawings used in the descriptions of the embodiment(s) will be briefly introduced. Obviously, the following described drawings are merely some embodiments of the present invention. To those skilled in the art, other drawings may be obtained based on these drawings without creative work.

DETAILED DESCRIPTION

The technical solutions of the embodiment(s) of the present invention will be clearly and completely described in conjunction with the drawings of the embodiment(s) of the present invention. Obviously, the described embodiment(s) is only a part of embodiments of the present invention, but not all the embodiments. Based on the embodiment(s) of the present invention, all other embodiments obtained by those skilled in the art without creative work are all within the protection scope of the present invention.

Figure 1:
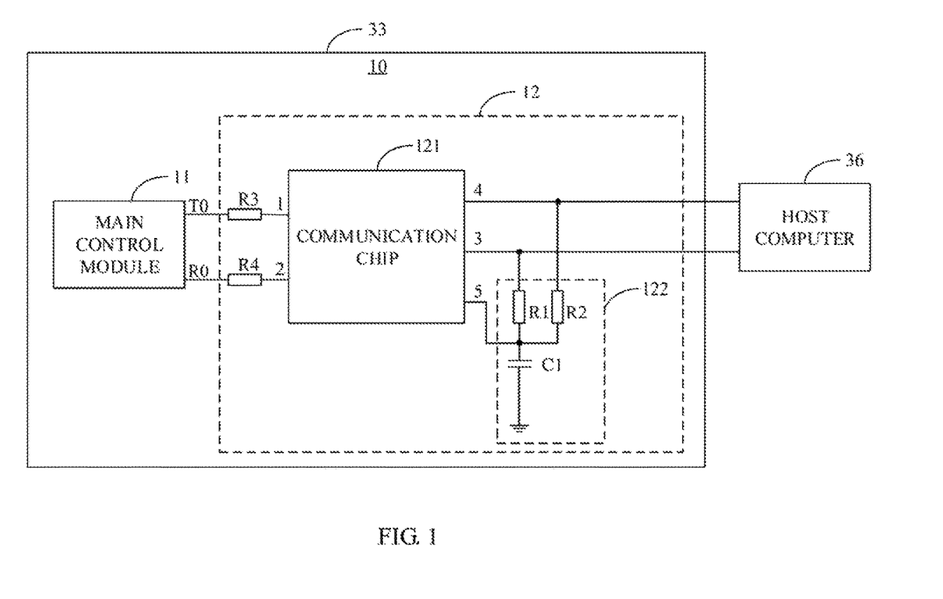
FIG. 1 is a schematic block diagram of a servo connecting with a host computer of a preferred embodiment of the present invention.

FIG. 1 is a schematic block diagram of a servo 33 connecting with a host computer 36 of a preferred embodiment of the present invention. The servo 33 includes a servo control system 10. The servo control system 10 includes a main control module 11 and a communication module 12. The communication module 12 is coupled between the main control module 11 and the host computer 36, and used to transmit data between the main control module 11 and the host computer 36. In the present embodiment, the servo 33 is preset with a serial number that is different from other servos.

The main control module 11 includes a first data terminal T0 and a second data terminal R0. The communication module 12 includes a communication chip 121 and a voltage balancing circuit 122. The communication chip 121 includes a first communication port 1, a second communication port 2, a third communication port 3, a fourth communication port 4, and a balance voltage output terminal 5. The first communication port 1 and the second communication port 2 are respectively, corresponding coupled to the first data terminal T0 and the second data terminal R0 of the main control module 11 via a CAN bus. The third communication port 3 and the fourth communication port 4 both are coupled to the host computer via a CAN bus. The balance voltage output terminal 5 is coupled to the third communication port 3 and the fourth communication port 4 via the voltage balancing circuit 122. Wherein, the first data terminal T0 of the main control module 11 sends, via the first communication port 1 of the communication chip 121 and the CAN bus, a first communication signal to the host computer. The second data terminal R0 of the main control module 11 receives, via the second communication port 2 of the communication chip 121, a second communication signal transmitted from the host computer. The balance voltage output terminal 5 controls a common mode voltage difference between the first communication signal and the second communication signal via the voltage balancing circuit 122. In the present embodiment, the host computer 36 is arranged at the body of robot. When the servo 33 is powered up, the main control module 11 transmits, via the first data terminal T0 and the first communication port 1 of the communication module 12, a serial number preset in the servo 33 to the host computer 36. When the host computer 36 receives the serial number of the servo 33, it randomly assigns an identity identification (ID) number, and transmits, via the second communication port 2 of the communication module 12 and the second data terminal R0, the ID number along with the serial number to the main control module 11 of the servo 33. In the present embodiment, the ID number of the servo 33 is different from the ID numbers of other servos. Thus, it is convenient for the host computer 36 to acquire the information of the servo 33 through the communication module 12 of the servo 33, and transmit corresponding instruction information to the servo 33 through the communication module 12.

More preferably, the voltage balancing circuit 122 includes a capacitor C1, a first resistor R1 and a second resistor R2. The third communication port 3 of the communication chip 121 is grounded via the first resistor R1 and the capacitor C1 that are coupled in series to each other. The fourth communication port 4 of the communication chip 121 is coupled to a node between the first resistor R1 and the capacitor C1 via the second resistor R2. The balance voltage output terminal 5 of the communication chip 121 is coupled to the node between the between the first resistor R1 and the capacitor C1. The first communication port 1 is coupled to the first data terminal T0 of the main control module 11 via a third resistor R3, for transmitting data outputted by the main module 11. The second communication port 2 is coupled to the second data terminal R0 of the main control module 11 via a fourth resistor R4, for transmitting data to the main module 11. The communication module 12 and the main control module 11, as well as the communication module 12 and the host computer 36, are connected to and communicate with each other via a CAN bus. The present embodiment suppresses, through the balance voltage output terminal 5 and the voltage balancing circuit 122, the signal common mode voltage difference caused by that the ground levels of the third communication port 3 and the fourth communication port 4 of the communication chip 121 are different, or the reverse current caused by other nodes that are not powered up. In an embodiment of the present invention, referring to FIG. 2, the servo control system 10 further includes a power supply module 13 and a charge detection module 14 coupled to the main control module 11. The power supply module 13 is used to provide a power supply for the servo, and the charge detection module is used to collect a charge of a battery inside the servo. Wherein, the power supply module 13 can provide power supply voltages of 1.5V, 5V and 3.3V.

Figure 2:
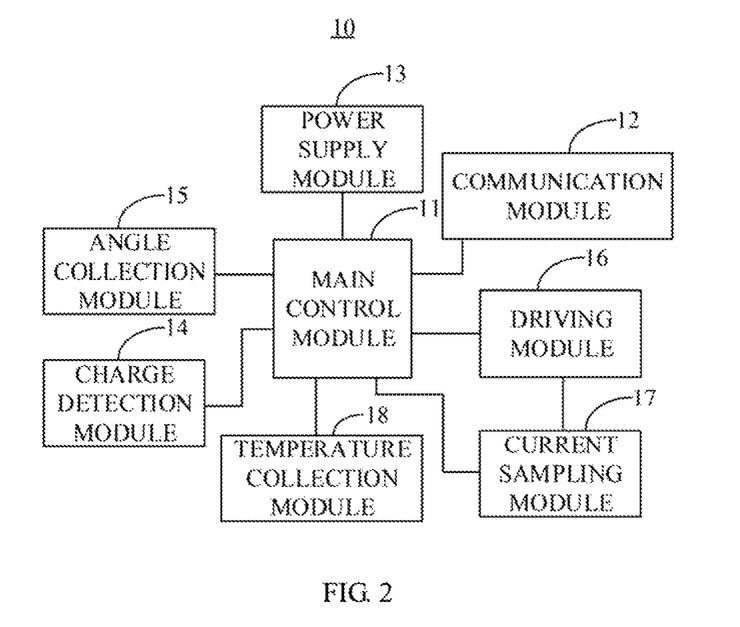
FIG. 2 is a block diagram of a servo control system of a preferred embodiment of the present invention.
Figure 3:
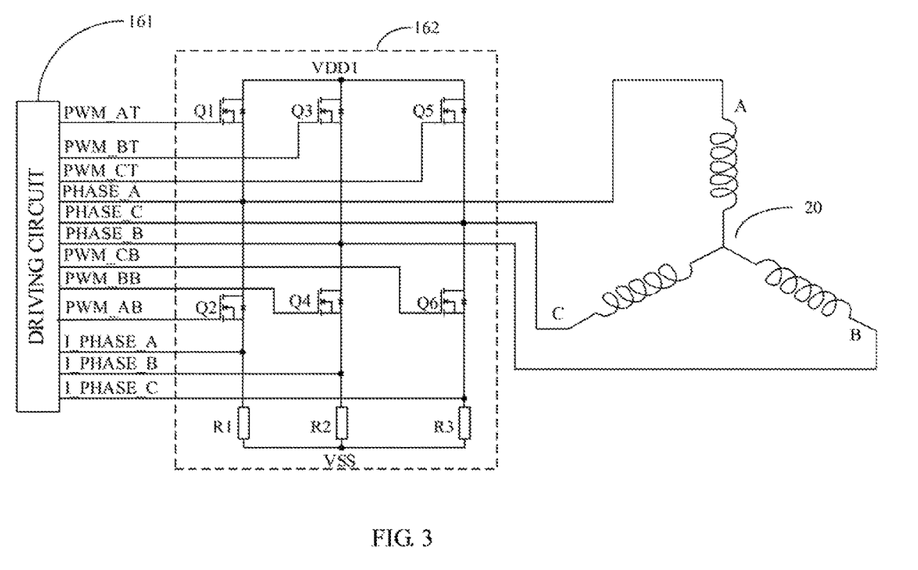
FIG. 3 is a circuit diagram of a driving module of a preferred embodiment of FIG. 2.

The servo control system 10 further includes an angle collection module 15 coupled to the main control module 11. The angle collection module 15 is used to acquire information of rotation angle of a servo. The main control module 11 is used to control motion of the servo according to the information of angle. Referring to FIG. 3, the servo 33 includes an electric motor 20 therein. Preferably, the angle collection module 15 includes a magnetic encoder used to acquire information of angle of the servo according to change of magnetic field when the electric motor 20 rotates. The angle collection module 15 may be a potentiometer that acquire information of angle of the servo according to change of position of the electric motor.

With continuing reference to FIG. 2, the servo control system 10 further includes a driving module 16 coupled to the main control module 11. The driving module 16 is used to receive a control signal transmitted from the main control module 11 and output a driving pulse signal according to the control signal to drive the electric motor 20 arranged in the servo to rotate.

Referring to FIG. 3, the driving module 16 includes a driving circuit 161 and an electronic switch circuit 162. The driving circuit 161 is coupled to the main control module 11. The electronic switch circuit 162 is coupled between the driving circuit 161 and the electric motor 20 of the servo. Wherein, the driving circuit 161 receives a control signal outputted by the main control module 11 and outputs a driving signal according to the control signal. The electronic switch circuit 162 outputs a driving pulse to the electric motor 20 according to the driving signal, to control the electric motor 20 to rotate. In the present embodiment, by arranging the driving circuit 161 and the electronic switch circuit 162 to be separated from each other, it can be convenient for heat dissipation and strengthens the driving capability.

In the present embodiment, the electric motor 20 is a three-phase driving motor. The neutral points of three-phase windings are coupled together. There are always two phase windings that are energized to control the electric motor 20 to rotate in a forward direction or in a reverse direction at any moment. The electric motor 20 includes a first terminal A, a second terminal B and a third terminal C. The electronic switch circuit 122 includes a first MOS transistor Q1, a second MOS transistor Q2, a third MOS transistor Q3, a fourth MOS transistor Q4, a fifth MOS transistor Q5 and a sixth MOS transistor Q6. Control terminals of the first MOS transistor Q1, the second MOS transistor Q2, the third MOS transistor Q3, the fourth MOS transistor Q4, the fifth MOS transistor Q5 and the sixth MOS transistor Q6 are coupled to the driving circuit 161. First path terminals of the first MOS transistor Q1, the third MOS transistor Q3 and the fifth MOS transistor Q5 are connected to a first reference voltage VDD1. A second path terminal of the first MOS transistor Q1 is coupled to the first path terminal of the second MOS transistor Q2 and the first terminal A (i.e. phase A) of the electric motor 20. A second path terminal of the third MOS transistor Q3 is coupled to the first path terminal of the fourth MOS transistor Q4 and the second terminal B (i.e. phase B) of the electric motor 20. A second path terminal of the fifth MOS transistor Q5 is coupled to the first path terminal of the sixth MOS transistor Q6 and the third terminal C (i.e. phase C) of the electric motor 20. Second path terminals of the second MOS transistor Q2, the fourth MOS transistor Q4 and the sixth MOS transistor Q6 are connected to a second reference voltage VSS. Wherein, the first reference voltage VDD1 is preferable 24V, and the second reference voltage VSS is preferable ground.

More specifically, the control terminal of the first MOS transistor Q1 is coupled to the first terminal PWM_AT of the driving circuit 161. The second path terminal of the first MOS transistor Q1 is coupled to the second terminal PHASE_A of the driving circuit 161. The control terminal of the second MOS transistor Q2 is coupled to the third terminal PWM_AB of the driving circuit 161. The second path terminal of the second MOS transistor Q2 is coupled to the fourth terminal I_PHASE_A of the driving circuit 161. The control terminal of the third MOS transistor Q3 is coupled to the fifth terminal PWM_BT of the driving circuit 161. The second path terminal of the third MOS transistor Q3 is coupled to the sixth terminal PHASE_B of the driving circuit 161. The control terminal of the fourth MOS transistor Q4 is coupled to the seventh terminal PWM_BB of the driving circuit 161. The second path terminal of the fourth MOS transistor Q4 is coupled to the eighth terminal I_PHASE_B of the driving circuit 161. The control terminal of the fifth MOS transistor Q5 is coupled to the ninth terminal PWM_CT of the driving circuit 161. The second path terminal of the fifth MOS transistor Q5 is coupled to the tenth terminal PHASE_C of the driving circuit 161. The control terminal of the sixth MOS transistor Q6 is coupled to the eleventh terminal PWM_CB of the driving circuit 161. The second path terminal of the sixth MOS transistor Q6 is coupled to the twelfth terminal I_PHASE_C of the driving circuit 161. First path terminals of the second MOS transistor Q2, the fourth MOS transistor Q4 and the sixth MOS transistor Q6 are connected to the second path terminals of the first MOS transistor Q1, the third MOS transistor Q3 and the fifth MOS transistor Q5. Second path terminals of the second MOS transistor Q2, the fourth MOS transistor Q4 and the sixth MOS transistor Q6 are grounded, respectively, via a fifth resistor R5, a sixth resistor R6 and a seventh resistor R7. The first path terminal and the second path terminal of each MOS transistor correspond respectively to the source and the drain of the MOS transistor.

The working principle of the electronic switch unit 162 is as follows.

The first terminal PWM_AT of the driving circuit 161 outputs a control signal to the control terminal of the first MOS transistor Q1, and the third terminal PWM_AB outputs a control signal to the control terminal of the second MOS transistor Q2, which respectively controls the first MOS transistor Q1 and the second MOS transistor Q2 to conduct, thereby powering up the first terminal A of the electric motor 20.

Similarly, the driving circuit 161 controls the third MOS transistor Q3 and the fourth MOS transistor Q4 to conduct, respectively, via the fifth terminal PWM_BT and the seventh terminal PWM_BB, to power up the second terminal B of the electric motor 20. The driving circuit 161 controls the fifth MOS transistor Q5 and the sixth MOS transistor Q6 to conduct, respectively, via the ninth terminal PWM_CT and the eleventh terminal PWM_CB, to power up the third terminal C of the electric motor 20. In an embodiment of the present invention, the driving circuit 161 simultaneously powers up, via the electronic switch unit 162, any two terminals of the first terminal A, the second terminal B and the third terminal C of the electric motor 20 so as to control the electric motor 20 to rotate in a forward direction or a reverse direction.

The driving circuit 161 includes three driving units for respectively driving the first terminal A, the second terminal B and the third terminal C of the electric motor 20. The driving circuit 161 outputs a control signal to the control terminal of the first MOS transistor Q1, controls the first MOS transistor Q1 to conduct, and powers up the first terminal A of the electric motor 20 so as to control the electric motor 20 to rotate in a forward direction or a reverse direction. In an embodiment of the present invention, the driving circuit 161 powers up any two terminals of the first terminal A, the second terminal B and the third terminal C of the electric motor 20 at the same time so as to control the electric motor 20 to rotate in a forward direction or a reverse direction.

Figure 4A:
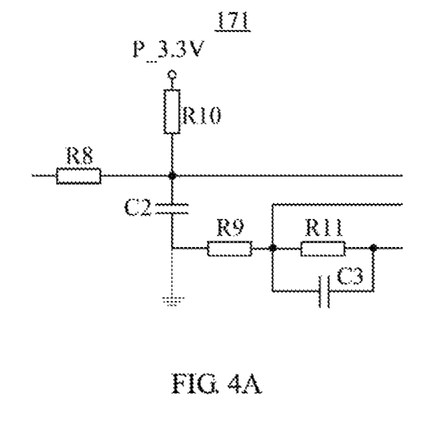
FIG. 4A is a circuit diagram of a current sampling module of a phase A of an electric motor of a preferred embodiment of FIG. 2.

Referring further to FIG. 2, the servo control system 10 further includes a current sampling module 17. The current sampling module 17 is used to detect a current operating current of the electric motor and feedback the current operating current of the electric motor to the main control module 11, thereby causing the main control module 11 to adjust a waveform of the driving pulse signal according to the current operating current of the electric motor. An input terminal of the current sampling module 17 is coupled to the electronic switch circuit 162 of the driving module 16. An output terminal of the current sampling module 17 is coupled to the main control module 11. The current sampling module 17 is used to collect current operation current of the electric motor 20 and transmit it to the main control module 11. Specifically, the current sampling module 13 includes a first through third current sampling circuit, for respectively perform a current sampling to the three phases A, B and C of the electric motor 20. Wherein, FIG. 4A is a schematic circuit diagram of a first current sampling circuit 171 of the current sampling module 17. The first current sampling circuit 171 is used to perform a current sampling to the phase A of the electric motor 20. The first current sampling circuit 171 includes an eighth resistor R8, a ninth resistor R9, a tenth resistor R10, an eleventh resistor R11, a second capacitor C2 and a third capacitor C3. A first end of the eighth resistor R8 is coupled to the second path terminal of the second MOS transistor Q2. A second end of the eight resistor R8 is coupled to a second voltage terminal P_3.3V via the tenth resistor R10. The second end of the eighth resistor R8 is further grounded, via the second capacitor C2. The first end of the ninth resistor R9 is coupled between the third capacitor C3 and the ground. The second end of the ninth resistor R9 and the second end of the eighth resistor R8 are coupled to the main control module 11. The ninth resistor R9 is further coupled to the main control module 11 via the eleventh resistor R11, and the third capacitor C3 is coupled to the two ends of the eleventh resistor R11 in parallel. The second current sampling circuit for sampling the phase B of the electric motor 20 and the first current sampling circuit 171 are the same in structural composition, element connections and working principle, and is not repeated herein.

Figure 4B:
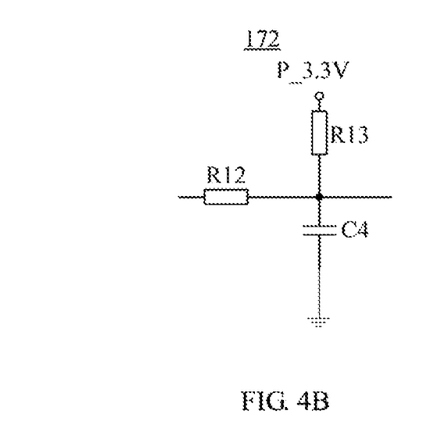
FIG. 4B is a circuit diagram of a current sampling module of a phase C of an electric motor of a preferred embodiment of FIG. 2.

FIG. 4B is a circuit diagram of a third current sampling circuit 172. The third current sampling circuit 172 is used to perform a current sampling to the phase C of the electric motor 20. The third current sampling circuit 172 includes a twelfth resistor R12, a thirteen resistor R13 and a fourth capacitor C4. A first end of the twelfth resistor R12 is coupled to the second path terminal of the sixth MOS transistor Q6, and a second end is coupled to the second voltage terminal P_3.3V via the thirteen resistor R13. The second end of the twelfth, resistor R12 is further grounded via the fourth capacitor C4. The second end of the twelfth resistor R12 is further coupled to the main control module 11 so as to feedback the detected current to the main control module 11.

Figure 5:
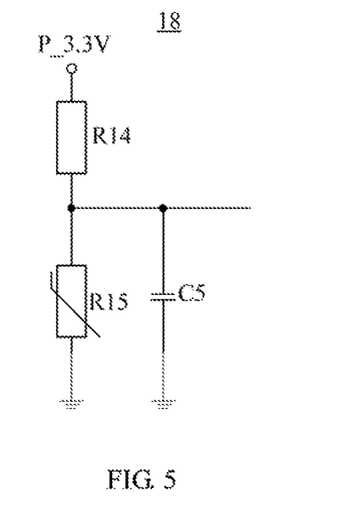
FIG. 5 is a circuit diagram of a temperature collection module of a preferred embodiment of FIG. 2.

With continuing reference to FIG. 2, the servo control system 10 further includes a temperature collection module 18 coupled to the main control module 11 and used to collect a temperature of an electric motor. If the collected temperature of the electric motor is greater than a preset threshold value, the main control module 11 controls the electric motor to stop rotating, or reduces a rotation speed of the electric motor. As shown in FIG. 5, the temperature collection module 18 includes a fourteen resistor R14, a fifteen resistor R15 and a fifth capacitor C5. A first end of the fourteen resistor R14 is coupled to the second voltage terminal P_3.3V, and a second end is grounded via the fifteen resistor R15 and the fifth capacitor C5. The second end of the fourteen resistor R14 is further coupled to the main control module 11 so as to feedback the detected temperature information to the main control module 11 through electrical signals, causing the main control module 11 to further control the rotation of the electric motor 20 according to detected temperature information. In the present embodiment, the fifteen resistor R15 is a negative temperature coefficient thermistor, its resistance changes along with temperature, divides voltage with the fourteen resistor R14 and converts it into electrical signals, and outputs them to the main control module 11, causing the main control module to further control the rotation of the electric motor 20 according to temperature detected by the temperature collection module 18.

Figure 6:
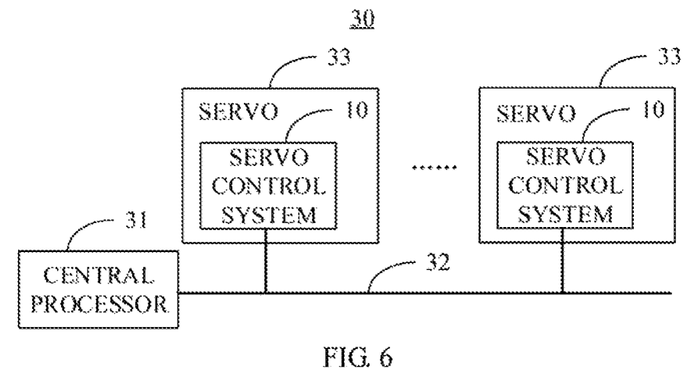
FIG. 6 is a schematic block diagram of a robot of a preferred embodiment of the present invention.

The present invention further provides a robot. As shown in FIG. 6, a robot 30 includes a host computer 36, a CAN bus 32, and a plurality of servos 33. The plurality of servos 33 are arranged at different positions of the robot 30. Each servo 33 includes a servo control system 10 as described hereinbefore. Each servo control system 10 communicates with the host computer 36 via the CAN bus 32. Each servo control system 10 includes all the elements and corresponding connection relationships of the servo control system 10 as described hereinbefore, and is not repeated herein. When one servo is powered up, the main control module 11 transmits, via the first data terminal T0 and the first communication port 1 of the communication module 12, a serial number preset in the servo 33 to the host computer 36. When the host computer 36 receives the serial number of the servo 33, it randomly assigns an identity identification number, and transmits, via the second communication port 2 of the communication module 12 and the second data terminal R0, the identity identification number along with the serial number to the main control module 11 of the servo 33.

Certainly, in other embodiments, when a servo 33 is powered up, the host computer 36 identifies, via the first data terminal T0 and the first communication port 1, a serial number preset in the servo 33. The host computer 36 assigns an identity identification (ID) number to the servo 33 according to the identified serial number of the servo 33, and transmits, via the second communication port 2 of the communication module 12 and the second data terminal R0 of the main control module 11, the ID number to the main control module 11 of the servo 33.

In summary, when one servo is powered up, it enables the host computer 36 to receive or identify the serial number of each servo 33 through the communication module 12, and assign different ID numbers to different servos 33 according to the serial number of each servo 33, which is convenient for the host computer 36 to transmit corresponding instruction information to different servos 33. Thus, after at least one servo 33 of the robot 30 is detached, these servos can be freely reinstalled without being limited to original positions of the servos and can still perform instructions sent by the host computer 36, which is convenient for reinstalling.

The foregoing descriptions are merely embodiments of the present invention, and the protection scope of the present invention is not limited thereto. All equivalent structural or process changes made according to the content of this specification and accompanying drawings in the present invention, or by directly or indirectly applying the present invention in other relevant technical fields, shall fall within the protection scope of the present invention.

What is claimed is:

1. A servo control system, applied to a servo electrically coupled to a host computer, characterized in that the servo control system comprises:
    a main control module comprising two data terminals; and
    a communication module comprising a first communication port, a second communication port, a third communication port, a fourth communication port, a voltage balancing circuit, and a balance voltage output terminal, the first communication port and the second communication port being respectively, correspondingly coupled to the two data terminals of the main control module, the third communication port and the fourth communication port being both coupled to the host computer, the balance voltage output terminal being coupled to the third communication port and the fourth communication port via the voltage balancing circuit; wherein:
    the main control module sends a first communication signal to the host computer via the first communication port, and receives a second communication signal transmitted from the host computer via the second communication port, and the balance voltage output terminal controls a common mode voltage difference between the first communication signal and the second communication signal via the voltage balancing circuit.

2. The servo control system according to claim 1, characterized in that the voltage balancing circuit comprises a capacitor, a first resistor and a second resistor, the third communication port of the communication chip is grounded via the first resistor and the capacitor that are coupled in series to each other, the fourth communication port of the communication chip is coupled to a node between the first resistor and the capacitor via the second resistor, and the balance voltage output terminal of the communication chip is coupled to the node between the between the first resistor and the capacitor.

3. The servo control system according to claim 1, characterized in that the communication module and the main control module, as well as the communication module and the host computer, are connected to and communicate with each other via a CAN bus.

4. The servo control system according to claim 1, characterized in that the servo control system further comprises a power supply module and a charge detection module coupled to the main control module, the power supply module is configured to provide a power supply for the servo, and the charge detection module is configured to collect a charge of a battery inside the servo.

5. The servo control system according to claim 1, characterized in that the servo control system further comprises an angle collection module coupled to the main control module, the angle collection module is configured to acquire information of rotation angle of the servo, and the main control module is configured to control motion of the servo according to the information of angle.

6. The servo control system according to claim 5, characterized in that the angle collection module comprises a magnetic encoder configured to acquire information of angle of the servo according to change of magnetic field when the driving motor rotates.

7. The servo control system according to claim 1, characterized in that the servo control system further comprises a driving module coupled to the main control module, the driving module is configured to receive a control signal transmitted from the main control module and output a driving pulse signal according to the control signal to drive an electric motor arranged in the servo to rotate.

8. The servo control system according to claim 1, characterized in that the servo control system further comprises a current sampling module configured to detect a current operating current of the electric motor and feedback the current operating current of the electric motor to the main control module, thereby causing the main control module to adjust a waveform of the driving pulse signal according to the current operating current of the electric motor.

9. The servo control system according to claim 8, characterized in that the servo control system further comprises a temperature collection module coupled to the main control module, wherein the temperature collection module is configured to collect a temperature of the electric motor, if the collected temperature of the electric motor is greater than a preset threshold value, the main control module controls the electric motor to stop rotating, or reduces a rotation speed of the electric motor.

10. A robot, characterized in that the robot comprises a host computer and a plurality of servos coupled to the host computer, each servo comprising a servo control system, the servo control system comprising:
a main control module comprising two data terminals; and
a communication module comprising a first communication port, a second communication port, a third communication port, a fourth communication port, a voltage balancing circuit, and a balance voltage output terminal, the first communication port and the second communication port being respectively, correspondingly coupled to the two data terminals of the main control module, the third communication port and the fourth communication port being both coupled to the host computer, the balance voltage output terminal being coupled to the third communication port and the fourth communication port via the voltage balancing circuit; wherein:
the main control module sends a first communication signal to the host computer via the first communication port, and receives a second communication signal from the host computer via the second communication port, and the balance voltage output terminal controls a common mode voltage difference between the first communication signal and the second communication signal via the voltage balancing circuit.

11. The robot according to claim 10, characterized in that the voltage balancing circuit comprises a capacitor, a first resistor, a second resistor, the third communication port of the communication, chip is grounded via the first resistor and the capacitor that are coupled in series to each other, the fourth communication port of the communication chip is coupled to a node between the first resistor and the capacitor via the second resistor, and the balance voltage output terminal of the communication chip is coupled to the node between the between the first resistor and the capacitor.

12. The robot according to claim 10, characterized in that the communication module and the main control module, as well as the communication module and the host computer, communicate with each other via a CAN bus.

13. The robot according to claim 10, characterized in that the servo control system further comprises a power supply module and a charge detection module coupled to the main control module, the power supply module is configured to provide a power supply for the servo, and the charge detection module is configured to collect a charge of a battery inside the servo.

14. The robot according to claim 10, characterized in that the servo control system further comprises an angle collection module coupled to the main control module, wherein the angle collection module is configured to acquire information of rotation angle of the servo, and the main control module is further configured to control motion of the servo according to the information of angle.

15. The robot according to claim 14, characterized in that the angle collection module is a magnetic encoder configured to acquire information of angle of the servo according to change of magnetic field when the driving motor rotates.

16. The robot according to claim 10, characterized in that the servo control system further comprises a driving module coupled to the main control module, the driving module is configured to receive a control signal transmitted from the main control module and output a driving pulse signal according to the control signal to drive an electric motor arranged in the servo to rotate.

17. The robot according to claim 10, characterized in that the servo control system further comprises a current sampling module configured to detect a current operating current of the electric motor and feedback the current operating current of the electric motor to the main control module, thereby causing the main control module to adjust a waveform of the driving pulse signal according to the current operating current of the electric motor.

18. The robot according to claim 16, characterized in that the servo control system further comprises a temperature collection module coupled to the main control module, the temperature collection module is configured to collect a temperature of the electric motor, if the collected temperature of the electric motor is greater than a preset threshold value, the main control module controls the electric motor to stop rotating, or reduces a rotation speed of the electric motor.

19. A robot, characterized in that the robot comprises a host computer and a plurality of servos coupled to the host computer, each servo comprising a servo control system, the servo control system comprising:
   a main control module comprising a first data terminal and a second data terminal; and
   a communication module comprising a first communication port, a second communication port, a third communication port, a fourth communication port, the first communication port and the second communication port being respectively, correspondingly coupled to the first data terminal and the second data terminal of the main control module, and the third communication port and the fourth communication port being both coupled to the host computer; wherein:
   the main control module sends a first communication signal to the host computer via the first communication port, and receives a second communication signal transmitted from the host computer via the second communication port; and
   when one servo is powered up, the host computer identifies a serial number preset inside the servo via the first data terminal and the first communication port of the corresponding servo, the host computer assigns an identity identification number to the servo according to the identified serial number of the servo, and transmits the identity identification number to the main control module of the servo via the second communication port of the communication module and the second data terminal of the main control module.

20. The robot according to claim 19, characterized in that the communication module further comprises a balance voltage output terminal and a voltage balancing circuit, the voltage balancing circuit is coupled to the third communication port and the fourth communication port, and the balance voltage output terminal controls a common mode voltage difference between the first communication signal and the second communication signal via the voltage balancing circuit.

* * * * *

UNITED STATES PATENT AND TRADEMARK OFFICE
CERTIFICATE OF CORRECTION

PATENT NO. : 10,328,571 B2
APPLICATION NO. : 15/321729
DATED : June 25, 2019
INVENTOR(S) : Dong Liu et al.

It is certified that error appears in the above-identified patent and that said Letters Patent is hereby corrected as shown below:

On the Title Page

Column 1, item (73) Assignee, delete "UBERTECH Robotics Corp." and insert --UBTECH Robotics Corp.--.

Signed and Sealed this
Eighteenth Day of August, 2020

Andrei Iancu
*Director of the United States Patent and Trademark Office*